(12) United States Patent
Cardell et al.

(10) Patent No.: US 9,499,281 B2
(45) Date of Patent: Nov. 22, 2016

(54) LANDING ARRESTING SYSTEM FOR VERTICAL TAKE-OFF AND LANDING (VTOL) AERIAL VEHICLES, LANDING AND TAKE-OFF PLATFORM FOR VTOL AERIAL VEHICLES AND VTOL LOCKING MEMBER FOR AERIAL VEHICLES

(75) Inventors: Per-Erik Cardell, Linköping (SE); Kjell Stenbom, Norrköping (SE)

(73) Assignee: UMS Skeldar Sweden AB, Linköping (SE)

(*) Notice: Subject to any disclaimer, the term of this patent is extended or adjusted under 35 U.S.C. 154(b) by 37 days.

(21) Appl. No.: 14/408,468

(22) PCT Filed: Jul. 5, 2012

(86) PCT No.: PCT/SE2012/050790
§ 371 (c)(1),
(2), (4) Date: Dec. 16, 2014

(87) PCT Pub. No.: WO2014/007705
PCT Pub. Date: Jan. 9, 2014

(65) Prior Publication Data
US 2015/0151852 A1 Jun. 4, 2015

(51) Int. Cl.
*B64F 1/02* (2006.01)
*B64C 25/52* (2006.01)
*B64C 25/68* (2006.01)
(Continued)

(52) U.S. Cl.
CPC ............. *B64F 1/02* (2013.01); *B64C 25/52* (2013.01); *B64C 25/68* (2013.01); *B64F 1/007* (2013.01); *B64F 1/125* (2013.01); *E01F 3/00* (2013.01);
(Continued)

(58) Field of Classification Search
CPC .......... B64F 1/02; B64F 1/007; B64F 1/125; B64C 25/52; B64C 25/68
See application file for complete search history.

(56) References Cited

U.S. PATENT DOCUMENTS 4,235,272 A * 11/1980 Landsrath ............... B60C 27/16
152/213 R
2004/0256519 A1 12/2004 Ellis et al.
(Continued)

FOREIGN PATENT DOCUMENTS

GB 923864 A 4/1963
GB 930794 A 6/1963

OTHER PUBLICATIONS

European Search Report—Communication—February 5, 2016 (Issued in Application No. EP 12880637.9).
(Continued)

*Primary Examiner* — Justin Benedik
(74) *Attorney, Agent, or Firm* — Venable LLP; Eric J. Franklin

(57) ABSTRACT

A landing arresting system for vertical take-off and landing aerial vehicles. A landing and take-off platform and at least one vertical take-off and landing locking member have a projecting portion arranged at a lower portion of the vehicle. The landing and take-off platform includes a plurality of individually displaceable rolls, arranged substantially in a horizontal direction, and moveable back and forth, such that the projecting portion of the locking member can be entered, retained and released between two adjacent rolls. A landing and take-off platform for vertical take-off and landing aerial vehicles and a vertical take-off and landing locking member for aerial vehicles.

12 Claims, 5 Drawing Sheets

(51) Int. Cl.
    *B64F 1/00*     (2006.01)
    *B64F 1/12*     (2006.01)
    *E01F 3/00*     (2006.01)
    *B64C 25/32*    (2006.01)

(52) U.S. Cl.
    CPC .... *B64C 2025/325* (2013.01); *B64C 2201/182* (2013.01); *Y02T 50/82* (2013.01)

(56) References Cited

U.S. PATENT DOCUMENTS

2010/0224118 A1   9/2010   Hovland et al.

2011/0068224 A1*  3/2011   Kang .................... B64C 39/024
                                                     244/116
2011/0174925 A1*  7/2011   Ying ...................... B64F 1/005
                                                     244/114 R

OTHER PUBLICATIONS

PCT/ISA/210—International Search Report—March 18, 2013 (Issued in PCT/SE2012/050790).
PCT/ISA/237—Written Opinion of the International Searching Authority—March 18, 2013 (Issued in PCT/SE2012/050790).
PCT/IPEA/409—International Preliminary Report on Patentability—June 18, 2014—(Issued in PCT/SE2012/050790).

* cited by examiner

LANDING ARRESTING SYSTEM FOR VERTICAL TAKE-OFF AND LANDING (VTOL) AERIAL VEHICLES, LANDING AND TAKE-OFF PLATFORM FOR VTOL AERIAL VEHICLES AND VTOL LOCKING MEMBER FOR AERIAL VEHICLES

CROSS-REFERENCE TO RELATED APPLICATIONS

The application is the national phase under 35 U.S.C. §371 of PCT/SE2012/050790 filed 5 Jul. 2012.

TECHNICAL FIELD

The present invention relates to a landing arresting system for vertical take-off and landing (VTOL) aerial vehicles. The invention also relates to a landing and take-off platform for VTOL aerial vehicles and a VTOL locking member for aerial vehicles.

TECHNICAL BACKGROUND

A VTOL aerial vehicle can be used for a number of applications. The conditions under which a VTOL aerial vehicle must land may be variable. For example, the landing surface may be moving at the time the VTOL aerial vehicle is landing. For VTOL aerial vehicles that are operating at sea it is quit difficult to safely land on the deck of a ship due to constant sway, roll, pitch and yaw of a ship at sea. It can also be quite difficult to safely land on the deck of an offshore platform such as an oil drilling platform or on solid ground in zones exposed for violent winds. Therefore the VTOL aerial vehicle needs to be locked during landing in order to prevent sliding or toppling of the VTOL aerial vehicle. Sliding or toppling of a VTOL aerial vehicle can result in damage to or even loss of the VTOL aerial vehicle.

VTOL aerial vehicles often have a harpoon and grid securing system for securing the VTOL aerial vehicle to a platform during landing. These systems comprise a grid mounted on the landing and take-off platform. The harpoon is mounted underneath the VTOL aerial vehicle and substantially comprises a retractable arm and, at the end of the arm, a head for catching in the grid. During landing the harpoon descends vertically towards the grid and then goes down into the grid and thereby locks the VTOL aerial vehicle to the platform. Harpoon and grid securing system comprise, apart from a harpoon, an electric/pneumatic unit, hoses and mounting devices. Therefore the harpoon and grid securing system is quite large, heavy and bulky. In addition, there is no or little room for both a harpoon and grid securing system and a camera/radar sensor.

Another example of a known anchoring system for an unmanned aerial vehicle (UAV) landing vertical onto a ship is shown in document US-A1-2004256519. An aerial vehicle recovery system includes a landing pad secured or securable to a supporting surface. The landing pad has an upwardly facing capture surface having a passive retaining medium thereon. The aerial vehicle to be recovered includes one or more shoes affixed to a lower portion of the aerial vehicle. The shoes have a complementary passive retaining medium thereon configured to mate or interlock with or adhere to or otherwise interface with the retaining medium of the capture surface on the landing pad. The retaining medium on the landing pad and the complementary retaining medium on the aerial vehicle together form a passive retaining system that retains the vehicle on the landing pad upon the exertion of sufficient compressive force by the vehicle on the capture surface. The aerial vehicle recovery system can be used in conjunction with a variety of supporting surfaces, such as a ship's deck, an offshore platform, a truck grid, or the ground.

The system that is disclosed in the document US-A1-2004256519 has several drawbacks. One drawback is that the retaining medium on the aerial vehicle has to be released from the vehicle to allow the vehicle to be removed from the landing pad, leaving the retaining medium attached to the capture surface. The shoes must then be removed from the landing pad, such as by peeling the shoes from the capture surface, and new engagement components must be attached to the landing elements prior to each flight. Another drawback is that system is not suitable for aerial vehicles that are so heavy that the engagement components would be crushed. A further drawback is that the area of the landing pad is determined by the size of the landing gear of the aerial vehicle, which must contact the pad at all points.

As a consequence, in light of the above drawbacks, there is a need of a landing arresting system for VTOL aerial vehicles that allow for a fully automated operations cycle, whereby the aerial vehicle can be repeatedly launched, retrieved, serviced and re-launched, without manual intervention at any point, that is suitable for both lightweight and heavy VTOL aerial vehicles and whose landing and take-off platform is not determined by the size of the landing elements.

SUMMARY OF THE INVENTION

The subject of the present invention is to eliminate the drawbacks according to prior art. Further, the subject is to provide safely landing of a VTOL aerial vehicle, especially in turbulent winds or onto an irregularly-moving surface, such as the deck of a ship in a rough sea.

These subjects have been by fulfilled with the landing arresting system for VTOL aerial vehicles.

The landing arresting system for VTOL aerial vehicles comprise a landing and take-off platform and at least one VTOL locking member having a projecting portion arranged at a lower portion of the vehicle. The landing and take-off platform comprises a plurality of individually displaceable rolls, arranged substantially in a horizontal direction, and moveable back and forth. Thus, the projecting portion of the VTOL locking member can be entered, retained and released between two adjacent rolls.

This landing arresting system for VTOL aerial vehicles with an active VTOL locking member and an active landing and take-off platform allow for a fully automated operations cycle, whereby the aircraft can be repeatedly launched, retrieved, serviced and re-launched, without manual intervention at any point.

Further the present invention also relates to a VTOL locking member for aerial vehicles.

The VTOL locking member for aerial vehicles comprises a projecting portion that is disposed in a housing in which the projecting portion travels reciprocally.

Consequently, it will also be appreciated that the VTOL aerial vehicle can land on other landing elements apart from the landing and take-off platform, for example the ground. If the VTOL aerial vehicle lands on another landing element, the projecting portion of the VTOL locking member that is disposed in the housing will be displaced in the housing until the projecting portion of the VTOL locking member only protrudes from the upper part of the housing. Thereby the projecting portion does not get destroyed. It is an advantage if the VTOL locking member is displaceable with suspension, because it will enable soft landing and soft take off of the VTOL aerial vehicle. Known anchoring systems for aerial vehicles does not enable soft landing and soft take off because the locking member is not displaceable with suspension.

Furthermore, the present invention also relates to a landing and take-off platform for VTOL aerial vehicles.

The landing and take-off platform for VTOL aerial vehicles comprise a plurality of rolls, the rolls are individually displaceable such that two adjacent rolls can be moved back and forth relative each other, from a first position, where the rolls can spring relative each other and are parallel to each other, to a second position, where the rolls are at a distance apart and parallel to each other, and to a third position, where the rolls are close and parallel to each other.

Compared to known anchoring systems it is an advantage that the active landing and take-off platform for VTOL aerial vehicles allow the VTOL locking member to be removed from the landing and take-off platform without manual intervention. The landing and take-off platform for VTOL aerial vehicles is a construction that is easy to handle and is in the form of an arresting apparatus on a surface.

Other objectives, embodiments and advantages of the present invention are described in closer detail in the description and in the subsequent patent claims.

BRIEF DESCRIPTION OF THE DRAWINGS

The invention will hereinafter be described with reference to embodiments of the present invention and the accompanying drawings, in which.

DETAILED DESCRIPTION OF THE INVENTION

In the following a number of embodiments of the invention are shown and described. The same reference numbers have been used for the same or similar features throughout the description in the embodiments disclosed below.

Figure 1:
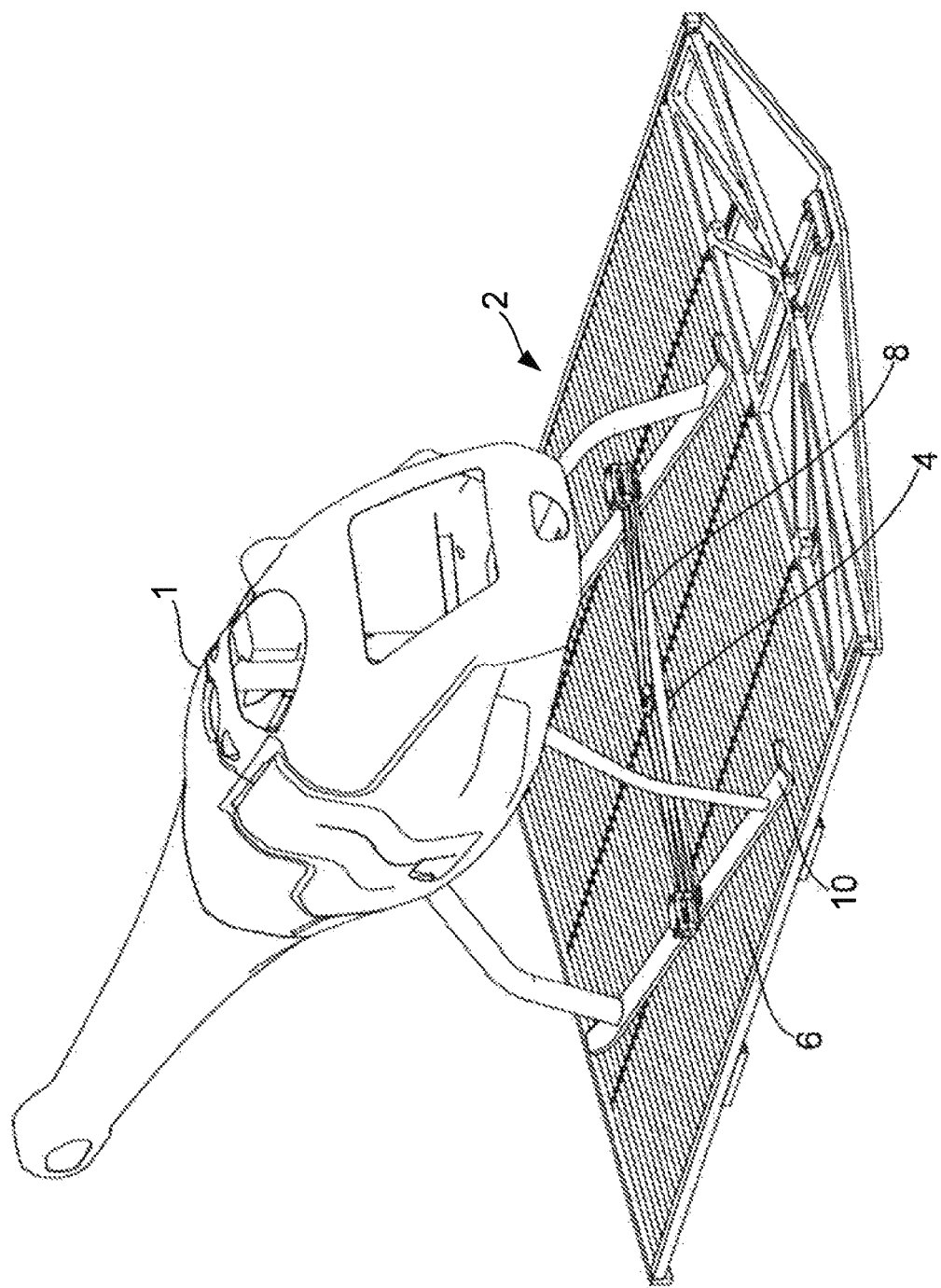
FIG. 1 shows a perspective view of a VTOL aerial vehicle and a landing arresting system for VTOL aerial vehicles comprising a VTOL locking member and a landing and take-off platform according to the present invention.

FIG. 1 shows a perspective view of a VTOL aerial vehicle 1 and a landing arresting system for VTOL aerial vehicles 2 comprising a VTOL locking member 4 and a landing and take-off platform 6 according to the present invention. The VTOL aerial vehicle 1 can be a manned aerial vehicle or an unmanned aerial vehicle (UAV). The landing arresting system for VTOL aerial vehicles 2 comprise at least one VTOL locking member 4. The VTOL locking member 4 is arranged on a cross member 8 arranged between two landing elements 10. According to an embodiment (not shown) at least one VTOL locking member 4 can also be arranged under each landing element 10. It is for example possible to have three or even more VTOL locking members 4 arranged under each landing element 10. The cross member 8 is not needed when the VTOL locking member(s) 4 is arranged under the landing elements 10. That is advantageous because then the VTOL aerial vehicles 1 weight is reduced and consequently the VTOL aerial vehicles 1 fuel consumption also is reduced. However, one advantage with the cross member 8 is that damage is avoided for mounting the VTOL locking member 4 on the landing elements 10.

Figure 2:
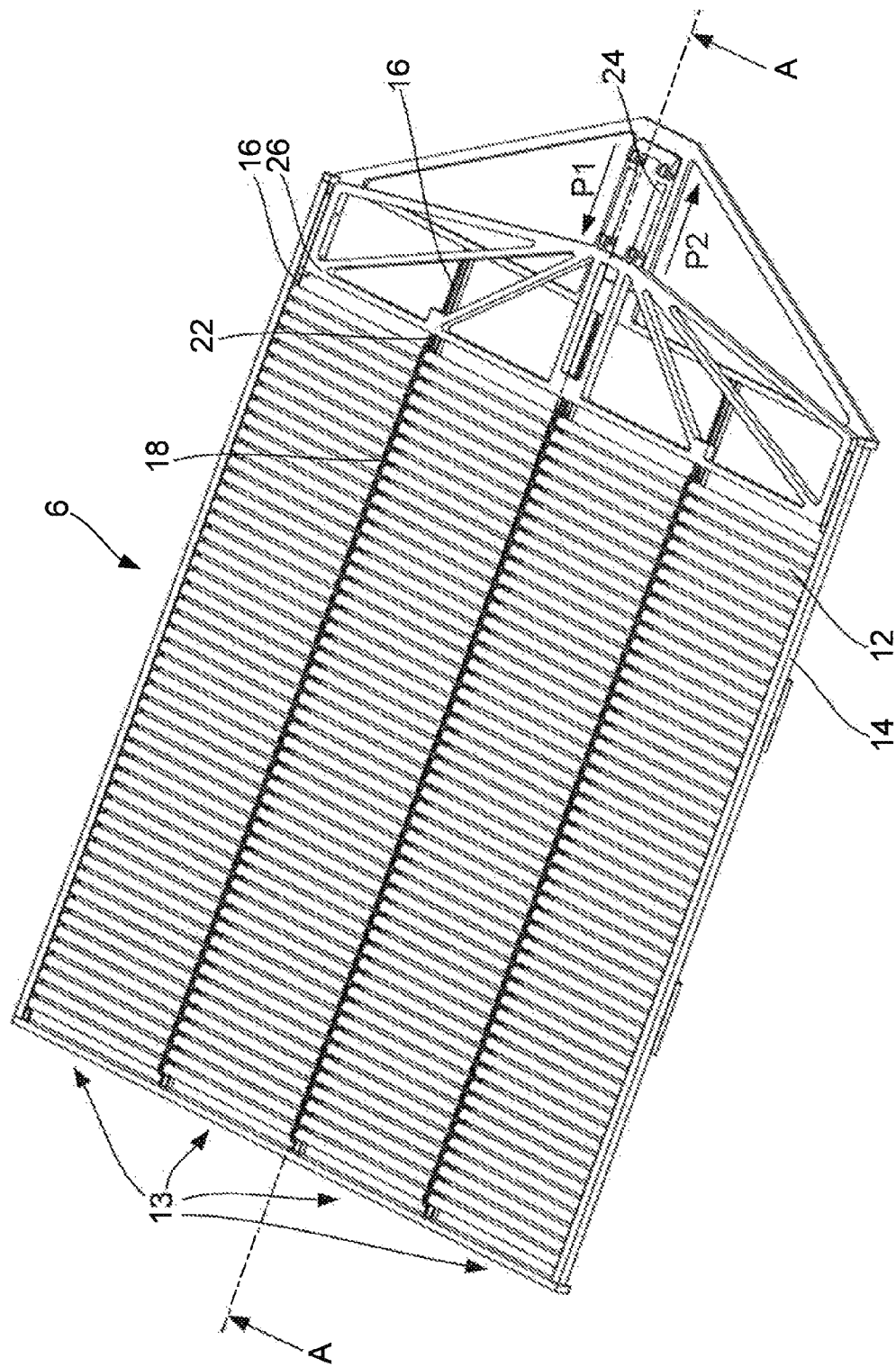
FIG. 2 shows a perspective view of the landing and take-off platform in FIG. 1 according to the present invention.
Figure 3:
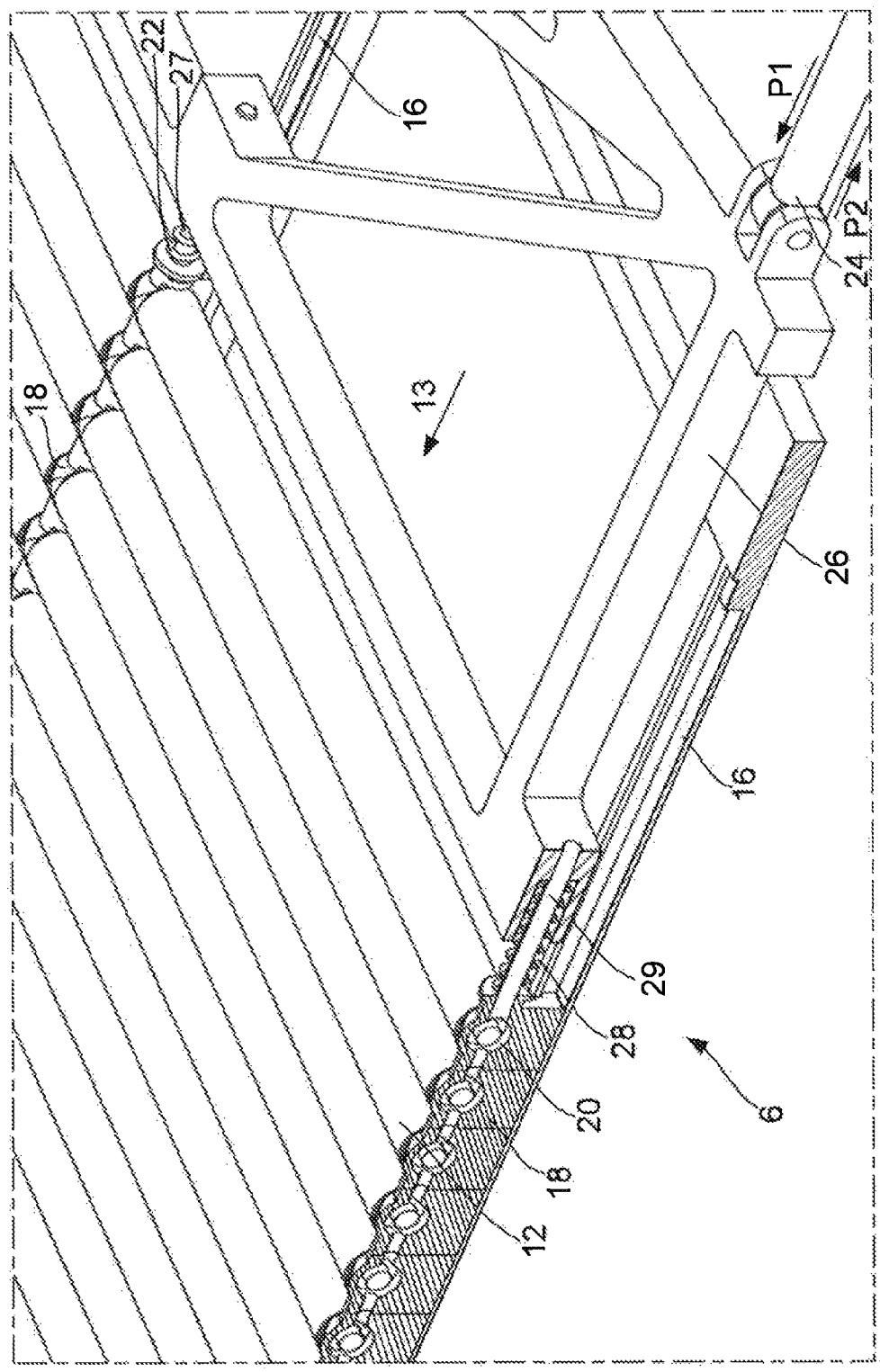
FIG. 3 shows an enlarged perspective view of a partial portion about the front part of the landing and take-off platform, in cross section A-A from FIG. 2, according to the present invention.
Figure 5A:
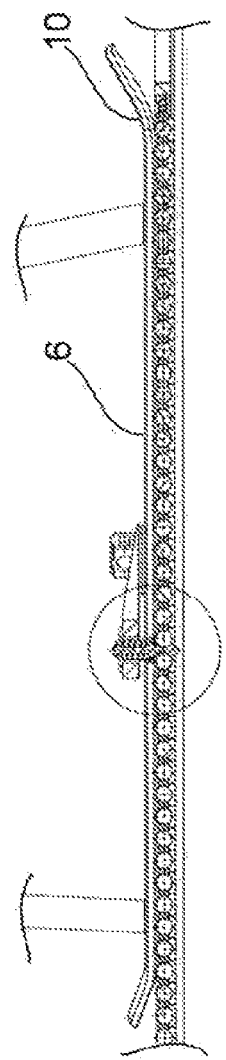
FIG. 5A shows a cross sectional view of an engagement of the VTOL locking member and the landing and take-off platform in FIG. 1 according to the present invention.
Figure 5B:
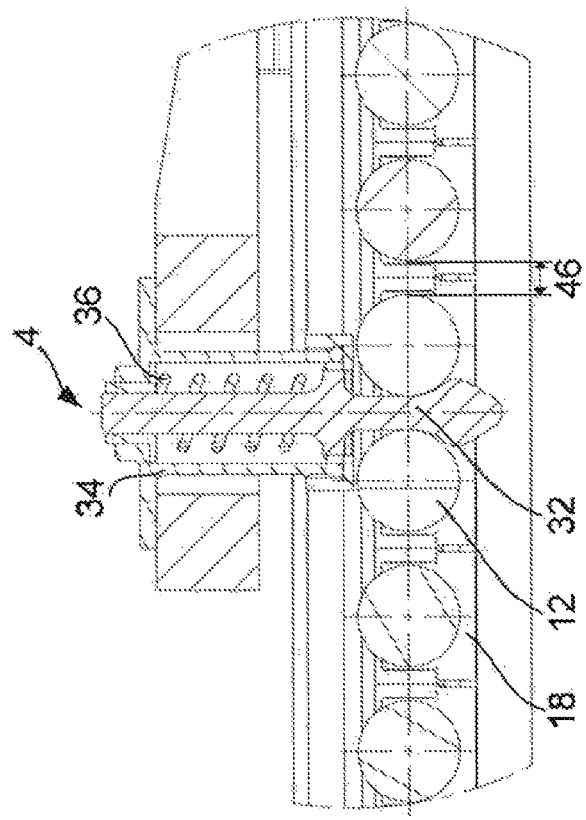
FIG. 5B shows an enlarged view of the engagement of the VTOL locking member and the landing and take-off platform in FIG. 5A (encircled portion) according to the present invention.

FIG. 2 shows a perspective view of the landing and take-off platform 6 in FIG. 1 according to the present invention. The landing and take-off platform 6 comprises a plurality of individually displaceable rolls 12 arranged in rows 13. In FIG. 2 are four rows 13 of rolls 12 shown. It is possible to have only one row 13 or a multiple number of rows 13. The rolls 12 are arranged within a framework 14. All rolls 12 are journally arranged with bearings in compartments 20, such that they can rotate around their own axis, shown in FIG. 3 and disclosed below. In the embodiment shown in FIG. 3 below, the bearing compartments 20 respectively are arranged in a bearing house 18 in each end of the roll 12 arranged in sliding or rolling engagement to a respective guiding rail 16. In terms of the landing and take-off platforms 6 area it is preferred that two rolls 12 in line with each other is mounted in the same bearing compartment 20, as shown in FIG. 2 and FIG. 3. Then the landing and take-off platform 6 comprises less bearing houses 18 and less guiding rails 16, consequently the area of the landing and take-off platform 6 can be reduced. In terms of function it is preferred that each roll 12 is individually arranged in a bearing compartment 20 because then the rows 13 are separated. This makes it possible to adapt the landing and take-off platform 6 to the weight of the VTOL aerial vehicles 1, such as disclosed in FIG. 1. If the VTOL aerial vehicle 1 is lightweight it is preferred to have more rows 13 because then less force is needed to displace the rolls 12. The framework 14 can be quadratic or rectangular. The respective rolls 12 are individually linearly guided and displaceable along the guiding rails 16 and prestressed toward each other by compression springs 22, such that two adjacent rolls 12 in each row 13 can be moved back and forth relative each other, substantially in a horizontal direction, sliding or rolling on the guiding rails 16 from a first normal position, where the rolls 12 can spring relative each other and are parallel to each other, to a second separated position where the rolls 12 are at a distance apart and parallel to each other and to a third locked position where the rolls 12 are close and parallel to each other. The first position is the normal position because in that position it is possible for the landing and take-off platform 6 to arrest the VTOL aerial vehicle 1. The guiding rails 16 can be integrated formed in the framework 14 or mounted separately to the framework 14, for example welded or screwed to the framework 14. The landing and take-off platform 6 also comprise at least one jack 24, which can be hydraulic or electric. The jacks 24 acts on a force transmitting element 26 who acts on the compression springs 22. The second separated position is described more in detail below (FIG. 5A-5B). In the third position, to lock the rolls 12, the jacks 24 moves the force transmitting element 26 in the direction of the compression springs 22 (see arrow P1). Then the compression springs 22 pushes the rolls 12 fully together. When the rolls 12 are fully pushed together the rolls 12 are locked and their movement along the guiding rails 16 is prevented. Hence, there is no or minimal gap between the rolls 12.

The landing and take-off platform 6 can be rectangular or quadratic. It can also be formed with almost any desired dimensions. This is an advantage because this makes the landing and take-off platform 6 compatible with a wide variety of supporting surfaces, such as a ship deck, an offshore platform or the ground, to which the landing and take-off platform 6 can be attached. The landing and take-off platform 6 is secured, either removably or permanently, to the supporting surface. A removable landing and take-off platform for VTOL aerial vehicles 6 comprise a securing system to firmly affix the landing and take-off platform 6 to the supporting surface. For example, a ship's deck may include hold down attachments points to which ropes, straps, or other fastening devices can be attached. Fittings are provided at suitable points affixed on the edge of the landing and take-off platform 6. The fittings can include rings, loops, eyes or other attachment components to which ropes, straps, or other fastening devices are also attached. For a non-removably landing and take-off platform for VTOL aerial vehicles, the landing and take-off platform for VTOL aerial can be integrally or permanently attached to or formed with the supporting surface. The landing and take-off platform 6 can for example be recessed in a ship deck.

FIG. 3 shows an enlarged perspective view of a partial portion about the front part of the landing and take-off platform 6, in cross section A-A from FIG. 2, according to the present invention. As disclosed above, to lock the rolls 12 the jacks 24 moves the force transmitting element 26 in the direction of the compression springs 22 (see arrow P1). Then the compression springs 22 pushes the rolls 12 fully together. In the locked third position, when the rolls 12 are fully pushed together, their movement is prevented and the rolls 12 are locked. To unlock the rolls 12 the jacks 24 moves the force transmitting element 26 opposite the direction of the compression springs 22 (see arrow P2). Consequently, the rolls 12 are moved to the first normal position or the second separated position. The normal position of the rolls 12 is when the rolls 12 are in an intermediate position between the second and third position and can spring relative each other and are parallel to each other, because then it is possible for the landing and take-off platform 6 to arrest the VTOL aerial vehicle 1. The compression springs 22 are arranged on a rod 27, arranged in a longitudinal extending bore 29 passing through the bearing houses 18, and in a recess 28 in the force transmitting element 26. The compression springs 22 enables a soft movement of the rolls 12. All rolls 12 are journally arranged with bearings in bearing compartments 20 which allow the rolls 12 to rotate around their own axis with low friction. The rolls 12 can be journally arranged in different kinds of bearings, for example ball bearings.

Figure 4:
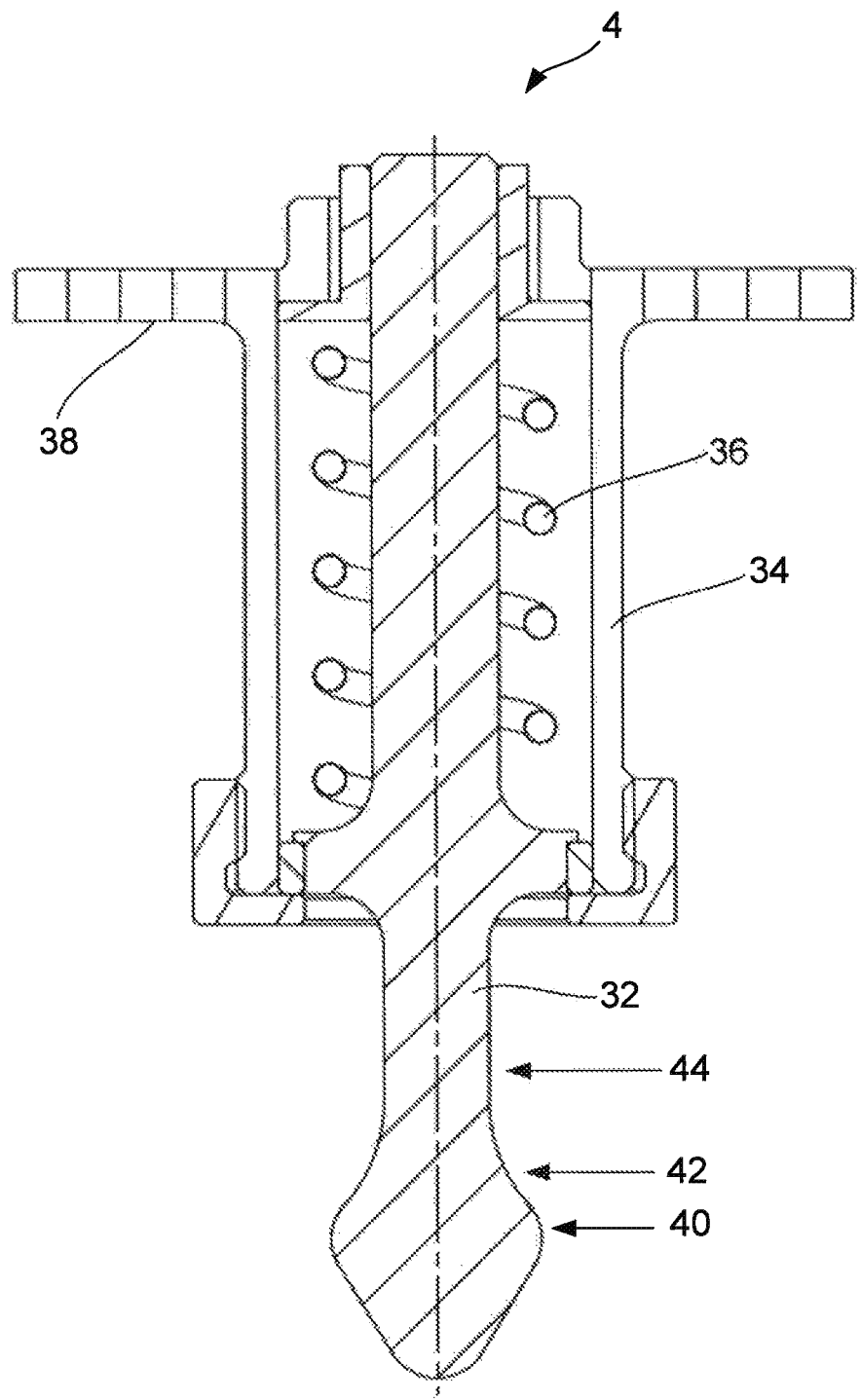
FIG. 4 shows a vertical cross sectional view of the VTOL locking member in FIG. 1 according to the present invention.

FIG. 4 shows a vertical cross sectional view of the VTOL locking member 4 in FIG. 1 according to the present invention. The VTOL locking member 4 has a projecting portion 32. The projecting portion 32 is disposed in a housing 34. The VTOL locking member 4 is active in that sense that the projecting portion 32 travels reciprocally in the housing 34 and that the projecting portion 32 is displaceable with suspension, for example using a hydraulic suspension (not shown) or a spring 36. This is an advantage because it will enable a soft landing and soft take off of the VTOL aerial vehicle 1. The first position of the projecting portion 32 is when the projecting member 32 is maximum protruding from the lower part of the housing 34. This is the normal position because this is the position the projecting portion 32 has when the aerial vehicle 1 is landing. The second position (not shown) of the projecting member 32 is when the projecting member 32 enters the landing and take-off platform 6 and the projecting member 32 protrudes from both the lower part and the upper part of the housing 34. The projecting portion 32 of the VTOL locking member 4 comprises a thickening portion 40, a bridging portion 42 behind the thickening portion 40 and closer to the housing 34 (when the projecting portion 32 is in the first position), and a narrowing portion 44 between the bridging portion 42 and the housing 34 (when the projecting portion 32 is in the first position). When the rolls 12 of the landing and take-off platform 6 are in a third position, as described above, where the rolls 12 are close and parallel to each other, the bridging portion 42, between the thickening portion 40 and the narrowing portion 44, allows the projecting portion 32 of the VTOL locking member 4 to be retained in the landing and take-off platform 6 because it prevents vertical movement of the VTOL locking member 4. Between two adjacent and parallel rolls 12 is a gap 46 situated. The narrowing portion 44 is adapted to fit the gaps 46 between the rolls 12. The housing 34 is arranged on the landing element 10 or the cross member 8 so that the projecting portion 32 of the VTOL locking member 4 is able to protrude from the upper part of the housing 34. It can for example be arranged so that an abutment portion 38 of the housing 34 abuts the upper surface of the landing element 10 or the upper surface of the cross member 8. If the VTOL aerial vehicle 1 lands on for example the ground, the projecting portion 32 of the VTOL locking member 4 that is disposed in the housing 34 will be displaced in the housing 34 until the projecting portion 32 of the VTOL locking member 4 only protrudes from the upper part of the housing 34. Thereby the projecting portion 32 of the VTOL locking member 4 does not get destroyed.

FIGS. 5A and 5B shows a cross sectional view of the engagement of the VTOL locking member 4 and the landing and take-off platform 6 in FIG. 1 according to the present invention. As described above, the projecting portion 32 of the VTOL locking member 4 is biased by a spring 36 in the housing 34. The rolls 12 in the landing and take-off platform 6 are biased by the compression springs 22. The spring force of the spring 36 acting on the VTOL locking member's 4 projecting portion 32 is greater than the total spring forces of the compression springs 22 acting on the rolls 12. The spring force of the spring 36 must be greater than the total spring forces of the compression springs 22 because otherwise, when the rolls 12 are unlocked and the VTOL aerial vehicle 1 is landing, the projecting portion 32 of the VTOL locking member 4 will spring back in the housing 34 and accordingly the projecting portion 32 of the VTOL locking member 4 will not enter the landing and take-off platform 6. When the VTOL aerial vehicle 1 lands on the landing and take-off platform 6, the two adjacent rolls 12 is moved by the projecting portion 32 to the position where the rolls 12 are able to be displaced away and to be positioned at a distance apart and then the projecting portion 32 with the thickening portion 40 of the VTOL locking member 4 enters between the two adjacent rolls 12 such that the thickening portion 40 is brought all the way through in between the rolls 12. To retain the projecting portion 32 of the VTOL locking member 4 between the two adjacent rolls 12 the rolls 12 needs to be locked such that two adjacent rolls 12 are pushed towards each other with the narrowing portion 44 in between. To lock the rolls 12 the jacks 24 moves the force transmitting element 26 in the direction of the compression springs 22

(see arrow P1 in FIGS. 2-3). Then the compression springs 22 pushes the rolls 12 fully together. The gap 46 between the rolls 12 when they are fully pushed together is approximately a 10 mm. To release the projecting portion 32 of the VTOL locking member 4 the rolls 12 are unlocked. To unlock the rolls 12 the jacks 24 moves the force transmitting element 26 in the direction opposite the compression springs 22 (see arrow P2). Then the compression springs 22 moves the rolls 12 to the position where the rolls 12 are at a distance apart. It is an advantage that the landing and take-off platform 6 is active because then the VTOL locking member 4 does not need to be manually removed from the landing and take-off platform 6. This allow for a fully automated operations cycle, whereby the aerial vehicle 1 can be repeatedly launched, retrieved, serviced and re-launched, without manual intervention at any point. The landing and take-off platform 6 is able to capture a VTOL vehicle 1 at various angles of attack and landing speeds. The shape of the bridging portion 42 of the projecting portion 32 of the VTOL locking member 4 corresponds to the shape of the rolls 12, thus the shape of the projecting portion 32 of the VTOL locking member 4 is adapted to fit well to the rolls 12. If the upper surface of the landing and take-off platform 6 is in line with the upper surface of the element(s) around the landing and take-off platform 6, for example if the landing and take-off platform 6 is recessed in a ship deck, the landing elements 10 do not need to be in contact with the landing and take-off platform 6 at all points. In that case the landing and take-off platforms 6 area is not determined of the size of the VTOL aerial vehicles landing elements 10. Then the area of the landing and take-off platform 10 is only determined by the accuracy of the automatic landing system of the VTOL aerial vehicle 1.

The invention is not limited by what has been particularly shown or described, except as indicated by the appended claims.

The invention claimed is:

1. A landing arresting system for vertical take-off and landing aerial vehicles, comprising:
   a landing and take-off platform; and
   at least one vertical take-off and landing locking member having a projecting portion arranged at a lower portion of the vehicle,
   wherein the landing and take-off platform comprises at least one row of a plurality of parallel individually displaceable rollers, arranged substantially in a horizontal direction, and wherein adjacent rollers are moveable back and forth relative to each other, such that the projecting portion of the vertical take-off and landing locking member can be entered, retained and released between two adjacent rolls.

2. The landing arresting system for vertical take-off and landing aerial vehicles according to claim 1, further comprising:
   a framework within which the rollers are arranged.

3. The landing arresting system for vertical take-off and landing aerial vehicles according to claim 1, further comprising:
   guiding rails upon which the rollers are arranged.

4. The landing arresting system for vertical take-off and landing aerial vehicles according to claim 1, further comprising:
   a bearing housing comprising bearing compartments, wherein the rollers are arranged in the bearing compartments.

5. The landing arresting system for vertical take-off and landing aerial vehicles according to claim 4, wherein each roller is individually arranged in a bearing compartment.

6. The landing arresting system for vertical take-off and landing aerial vehicles according to claim 4, wherein two rollers are arranged in one bearing compartment.

7. The landing arresting system for vertical take-off and landing aerial vehicles according to claim 1, further comprising:
   compression springs configured to prestress the rollers toward each other.

8. The landing arresting system for vertical take-off and landing aerial vehicles according to claim 7, further comprising:
   a force transmitting element and
   at least one jack to which the compression springs are attached.

9. The landing arresting system for vertical take-off and landing aerial vehicles according to claim 1, further comprising:
   a housing in which the projecting portion is arranged and travels reciprocally.

10. The landing arresting system for vertical take-off and landing aerial vehicles according to claim 1, wherein the projecting portion is spring loaded or hydraulically loaded.

11. The landing arresting system for vertical take-off and landing aerial vehicles according to claim 1, wherein the projecting portion includes a thickening portion.

12. A landing and take-off platform for vertical take-off and landing aerial vehicles, the landing and take-off platform comprising:
    at least one row of a plurality of parallel individually displaceable rollers, wherein adjacent rollers are moveable back and forth relative to each other, from a first normal position, where the rolls can spring relative each other, to a second engaged position where the rolls are forced a distance apart from each other and to a third locked position where the rolls are close to each other.

* * * * *